United States Patent
Fukabori

(10) Patent No.: US 11,307,305 B2
(45) Date of Patent: Apr. 19, 2022

(54) ULTRASONIC SENSOR

(71) Applicant: DENSO CORPORATION, Kariya (JP)

(72) Inventor: Kenji Fukabori, Kariya (JP)

(73) Assignee: DENSO CORPORATION, Kariya (JP)

( * ) Notice: Subject to any disclaimer, the term of this patent is extended or adjusted under 35 U.S.C. 154(b) by 173 days.

(21) Appl. No.: 16/865,020

(22) Filed: May 1, 2020

(65) Prior Publication Data

US 2020/0256984 A1    Aug. 13, 2020

Related U.S. Application Data

(63) Continuation of application No. PCT/JP2018/037265, filed on Oct. 4, 2018.

(30) Foreign Application Priority Data

Nov. 2, 2017   (JP) .............................. JP2017-212694

(51) Int. Cl.
   *G01S 15/02*    (2006.01)
   *G01S 15/931*   (2020.01)

(52) U.S. Cl.
   CPC ............ *G01S 15/02* (2013.01); *G01S 15/931* (2013.01); *G01S 2015/938* (2013.01)

(58) Field of Classification Search
   CPC ............................... G01S 15/02; G01S 15/931
   USPC .......................................................... 367/93
   See application file for complete search history.

(56) References Cited

U.S. PATENT DOCUMENTS

| 2003/0217584 A1* | 11/2003 | Sato ....................... G01N 29/02 73/23.32 |
| 2004/0003664 A1* | 1/2004 | Ishikawa .............. G01N 29/223 73/644 |
| 2018/0149694 A1 | 5/2018 | Miyazaki et al. |
| 2018/0222123 A1* | 8/2018 | Tamamoto .............. F16F 15/04 |

FOREIGN PATENT DOCUMENTS

| JP | 2003-032794 A | 1/2003 |
| JP | 2003-261971 A | 9/2003 |
| JP | 2012-065405 A | 3/2012 |
| JP | 2015-200579 A | 11/2015 |
| JP | 2017-175291 A | 9/2017 |

\* cited by examiner

*Primary Examiner* — Kerri L McNally
(74) *Attorney, Agent, or Firm* — Maschoff Brennan

(57) ABSTRACT

An ultrasonic sensor includes an ultrasonic wave transmitting and receiving device, an elastic holding member elastically supporting the ultrasonic wave transmitting and receiving device, and a sensor case housing and holding the elastic holding member. A case cylindrical portion of the sensor case includes an engagement protrusion provided to protrude inward in a radial direction. The elastic holding member includes a support bottom portion in contact with a transmitting-and-receiving-device bottom, an engagement recess provided to be recessed inward in the radial direction and thus house the engagement protrusion, and a leading projection provided at a position corresponding to the engagement recess with respect to a peripheral direction surrounding a central axis line, and provided to protrude from the support bottom portion toward the base-end side in the axial direction. The support bottom portion is formed as a thick portion. The engagement recess is provided in the support bottom portion.

6 Claims, 6 Drawing Sheets

ULTRASONIC SENSOR

CROSS-REFERENCE TO RELATED APPLICATION

The present application is a continuation application of International Application No. PCT/JP2018/037265, filed Oct. 4, 2018, which claims priority to Japanese Patent Application No. 2017-212694, filed Nov. 2, 2017. The contents of these applications are incorporated herein by reference in their entirety.

BACKGROUND

1. Technical Field

The present disclosure relates to an ultrasonic sensor.

2. Related Art

An ultrasonic sensor includes an ultrasonic transceiver capable of transmitting and receiving an ultrasonic wave, a holding body holding the ultrasonic transceiver, and a case housing and supporting the ultrasonic transceiver and the holding body.

SUMMARY

The present disclosure provides an ultrasonic sensor. An ultrasonic sensor according to one mode of the present disclosure is configured as follows.

The ultrasonic sensor includes an ultrasonic wave transmitting and receiving device, an elastic holding member, and a sensor case.

The ultrasonic wave transmitting and receiving device is formed in a columnar shape having an axial direction parallel with a central axis line.

The elastic holding member is a plastic elastic member elastically supporting the ultrasonic wave transmitting and receiving device, and formed in a cylindrical shape to allow housing a supported portion on a base-end side in the axial direction of the ultrasonic wave transmitting and receiving device.

The sensor case is configured to include a case cylindrical portion formed in a cylindrical shape having an inner peripheral surface in contact with an outer peripheral surface along the axial direction of the elastic holding member, and to house and hold the elastic holding member.

The case cylindrical portion includes an engagement protrusion provided nearer the base-end side in the axial direction than to a tip aperture having an opening on a tip side in the axial direction, and provided to protrude inward in a radial direction perpendicular to the axial direction.

The elastic holding member includes a support cylindrical portion, a support bottom portion, an engagement recess, and a leading projection.

The support cylindrical portion is formed in a cylindrical shape having an opening on the tip side in the axial direction, to be in contact with a transmitting-and-receiving-device side surface that is an outer peripheral surface along the axial direction of the ultrasonic wave transmitting and receiving device.

The support bottom portion is provided to protrude inward in the radial direction at a base-end portion in the axial direction of the support cylindrical portion and thus to be in contact with a transmitting-and-receiving-device bottom that is an end surface on the base-end side in the axial direction of the ultrasonic wave transmitting and receiving device.

The engagement recess is provided nearer the base-end side in the axial direction than to the support cylindrical portion, and provided to be recessed inward in the radial direction and thus house the engagement protrusion.

The leading projection is provided at a position corresponding to the engagement recess with respect to a peripheral direction surrounding the central axis line, and provided to project from the support bottom portion toward the base-end side in the axial direction.

The support bottom portion is formed as a thick portion having a thickness in the radial direction larger than thicknesses of the support cylindrical portion and the leading projection.

The engagement recess is provided in the support bottom portion.

DETAILED DESCRIPTION OF THE PREFERRED EMBODIMENTS

Figure 1:
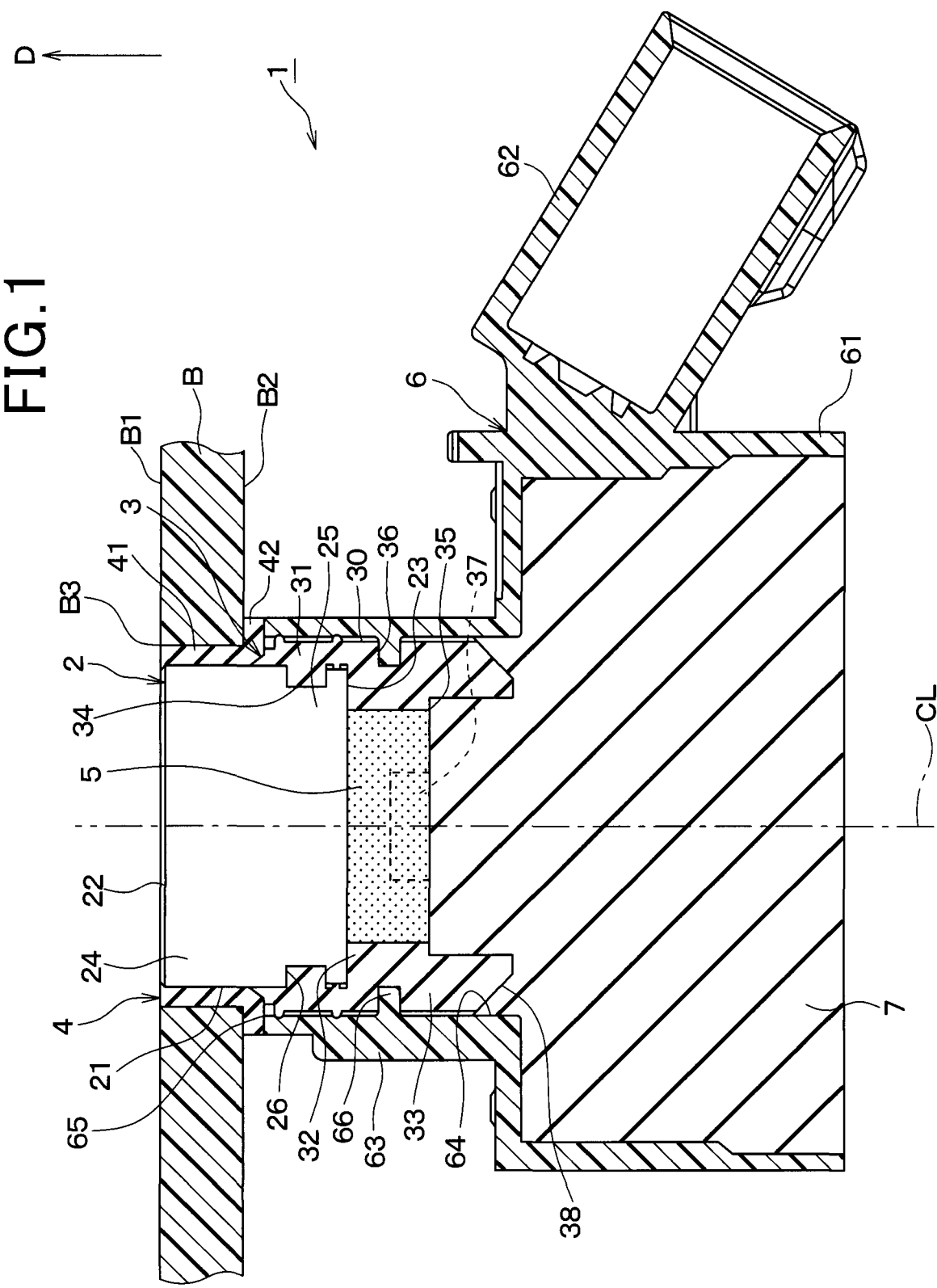
FIG. 1 is a sectional side view of an ultrasonic sensor according to an embodiment.
Figure 2:
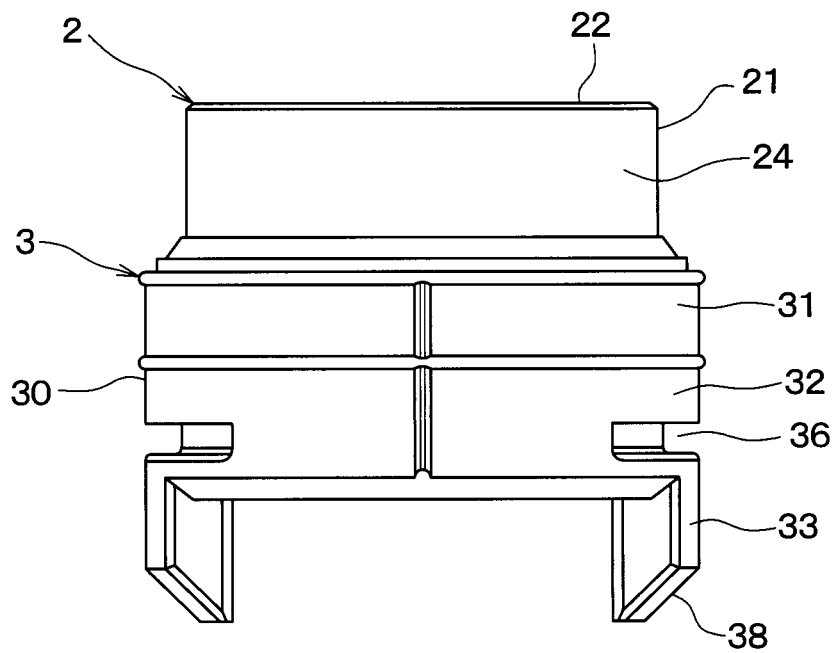
FIG. 2 is a side view of an ultrasonic wave transmitting and receiving device and an elastic holding member illustrated in FIG. 1.

An ultrasonic sensor described in JP 2015-200579 A includes a columnar ultrasonic transceiver capable of transmitting and receiving an ultrasonic wave, a cylinder-shaped elastic body covering and elastically holding the ultrasonic transceiver, and a plastic case housing and supporting the ultrasonic transceiver and the elastic body. The elastic body has a groove formed on an outer peripheral surface of the elastic body. This groove is engaged with a rib formed on an inner peripheral surface of the case.

The production of an ultrasonic sensor includes a step of inserting into a case an elastic body elastically holding an ultrasonic transceiver. In this insertion step, it is necessary to appropriately set the elastic body and the case at a prescribed positional relationship in an axial direction. The "axial direction" is a direction parallel with a central axis line of the ultrasonic transceiver. That is, a worker inserts the elastic body to which the ultrasonic transceiver is attached into the case along the axial direction.

In this regard, it has, in this kind of conventional ultrasonic sensor, been difficult for the worker to accurately determine that the elastic body and the case are set at the prescribed positional relationship in the axial direction during the insertion step. Therefore, the worker may possibly finish the insertion step before the elastic body and the case are set at the prescribed positional relationship in the axial direction. Also, the worker may possibly continue to put pressure on the elastic body in the insertion direction even when the elastic body and the case are at the prescribed positional relationship in the axial direction.

The present disclosure has been made in view of the circumstances and the like described above. That is, an object of the present disclosure is to improve workability during the production of an ultrasonic sensor than during the production of a conventional ultrasonic sensor.

According to one viewpoint of the present disclosure, an ultrasonic sensor is configured as follows.

That is, the ultrasonic sensor includes:

an ultrasonic wave transmitting and receiving device formed in a columnar shape having an axial direction parallel with a central axis line;

an elastic holding member that is a plastic elastic member elastically supporting the ultrasonic wave transmitting and receiving device, and that is formed in a cylindrical shape to allow housing a supported portion on a base-end side in the axial direction of the ultrasonic wave transmitting and receiving device; and a sensor case configured to include a case cylindrical portion formed in a cylindrical shape having an inner peripheral surface in contact with an outer peripheral surface along the axial direction of the elastic holding member, and to house and hold the elastic holding member.

The case cylindrical portion includes an engagement protrusion provided nearer the base-end side in the axial direction than to a tip aperture having an opening on a tip side in the axial direction, and provided to protrude inward in a radial direction perpendicular to the axial direction.

The elastic holding member includes:

a support cylindrical portion formed in a cylindrical shape having an opening on the tip side in the axial direction, to be in contact with a transmitting-and-receiving-device side surface that is an outer peripheral surface along the axial direction of the ultrasonic wave transmitting and receiving device;

a support bottom portion provided to protrude inward in the radial direction at a base-end portion in the axial direction of the support cylindrical portion and thus to be in contact with a transmitting-and-receiving-device bottom that is an end surface on the base-end side in the axial direction of the ultrasonic wave transmitting and receiving device;

an engagement recess provided nearer the base-end side in the axial direction than to the support cylindrical portion, and provided to be recessed inward in the radial direction and thus house the engagement protrusion; and a leading projection provided at a position corresponding to the engagement recess with respect to a peripheral direction surrounding the central axis line, and provided to project from the support bottom portion toward the base-end side in the axial direction.

The support bottom portion is formed as a thick portion having a thickness in the radial direction larger than thicknesses of the support cylindrical portion and the leading projection.

The engagement recess is provided in the support bottom portion.

This configuration first allows, in a step of producing the ultrasonic sensor, the supported portion on the base-end side in the axial direction of the ultrasonic wave transmitting and receiving device to be inserted into the support cylindrical portion of the elastic holding member. The insertion brings the transmitting-and-receiving-device bottom, which is the end surface on the base-end side in the axial direction of the ultrasonic wave transmitting and receiving device, into contact with the support bottom portion provided to protrude inward in the radial direction at the base-end portion of the support cylindrical portion. Thus, the ultrasonic wave transmitting and receiving device is elastically supported by the elastic holding member.

Subsequently, the elastic holding member elastically supporting the ultrasonic wave transmitting and receiving device is inserted from the elastic holding member's leading-projection side on the base-end side in the axial direction into the case cylindrical portion of the sensor case along the central axis line. The insertion allows the engagement protrusion to be housed in the engagement recess, with the engagement protrusion being, in the case cylindrical portion, provided to protrude inward in the radial direction, and the engagement recess being, in the elastic holding member, provided to be recessed inward in the radial direction. Thus, the sensor case houses and holds the elastic holding member.

In the insertion of the elastic holding member into the case cylindrical portion, the leading projection is brought into contact with the engagement protrusion before the engagement protrusion is housed in the engagement recess. The contact of the leading projection with the engagement protrusion elastically distorts the leading projection while making the leading projection bend toward the central axis line.

The leading projection is provided at a position corresponding to the engagement recess with respect to the peripheral direction surrounding the central axis line. Therefore, the elastic deformation of the leading projection in the aspect described above increases the opening width along the axial direction of the engagement recess. Thus, the housing of the engagement protrusion in the engagement recess, that is, the engagement of the engagement protrusion with the engagement recess, can be beneficially promoted.

The housing of the engagement protrusion in the engagement recess sets the elastic holding member elastically supporting the ultrasonic wave transmitting and receiving device, and the case cylindrical portion of the sensor case, at a prescribed positional relationship in the axial direction. The housing of the engagement protrusion in the engagement recess during the insertion of the elastic holding member into the case cylindrical portion restores the elastic deformation of the leading projection. The impact during this restoration enables a worker to accurately determine that the elastic holding member and the case cylindrical portion are set at the prescribed positional relationship in the axial direction.

As described above, these configurations can improve workability during the production of the ultrasonic sensor than during the production of a conventional ultrasonic sensor.

In the specification and the like, the parenthesized reference sign assigned to each means indicates one example of the corresponding relationship between the means and a specific means described in the embodiment below. Accordingly, the present disclosure is not to be limited by any description of reference signs.

Hereinafter, an embodiment is described on the basis of drawings. Various applicable modified examples of one embodiment are described together after the description of the embodiment, because mixing description of the modified examples with description of the embodiment may possibly lead to misunderstanding of the embodiment.

(Configurations)

FIG. 1 illustrates a schematic configuration of an ultrasonic sensor 1 according to the present embodiment when the ultrasonic sensor 1 is mounted on a vehicle. With reference to FIG. 1, the ultrasonic sensor 1, which is vehicle-mounted, or the in-vehicle ultrasonic sensor 1 is configured to transmit and receive an ultrasonic wave for detecting an object around the vehicle. That is, the ultrasonic sensor 1 according to the present embodiment is configured to be to a vehicle on a bumper B. The bumper B is a tabular vehicle-body component bumper.

The bumper B includes a bumper outer face B1 constituting an outer surface of the vehicle, and a bumper inner face B2, which is the rear surface of the bumper outer face B1. The bumper B further includes an attachment hole B3, which is a through hole for mounting the ultrasonic sensor 1. That is, the attachment hole B3 is formed to penetrate the bumper B in the thickness direction of the bumper B.

The ultrasonic sensor 1 includes an ultrasonic wave transmitting and receiving device 2, an elastic holding member 3, an elastic covering member 4, a damper 5, a sensor case 6, and a filler 7.

The ultrasonic wave transmitting and receiving device 2 is configured to be capable of transmitting and receiving an ultrasonic wave. That is, the ultrasonic wave transmitting and receiving device 2 is configured to transmit a probe wave in along a directional axis and receive a reflected wave reflected by an object existing around the vehicle.

The ultrasonic wave transmitting and receiving device 2 has a columnar outer shape having a central axis line CL parallel with the directional axis. Specifically, the ultrasonic wave transmitting and receiving device 2 in the present embodiment is formed in a columnar shape provided to extend in an axial direction parallel with the central axis line CL.

Hereinafter, for simplifying the description, the axial direction is defined as an upward direction in FIG. 1, that is, as the direction of an arrow D. In this case, the axial direction is substantially consistent coincident with the transmitting direction of the ultrasonic wave from the ultrasonic wave transmitting and receiving device 2. The axial direction can also be referred to as a protruding direction of the ultrasonic wave transmitting and receiving device 2 in the ultrasonic sensor 1. The phrase "a tip side in the axial direction" corresponds to an upper side in FIG. 1. The phrase "a base-end side in the axial direction" corresponds to a lower side in FIG. 1.

The ultrasonic wave transmitting and receiving device 2 includes a transmitting-and-receiving-device side surface 21, a transmitting-and-receiving-device top 22, and a transmitting-and-receiving-device bottom 23. The transmitting-and-receiving-device side surface 21 is a columnar outer peripheral surface of the ultrasonic wave transmitting and receiving device 2, and is formed along the axial direction. That is, the transmitting-and-receiving-device side surface 21 has a generatrix parallel with the central axis line CL. The transmitting-and-receiving-device top 22 is an ultrasonic wave transmitting and receiving surface provided on an end surface on the tip side in the axial direction of the ultrasonic wave transmitting and receiving device 2, and is formed in a substantially circular planar shape having the central axis line CL as a normal direction. The transmitting-and-receiving-device bottom 23 is an end surface on the base-end side in the axial direction of the ultrasonic wave transmitting and receiving device 2, and is formed in a substantially circular planar shape having the central axis line CL as a normal direction.

The ultrasonic wave transmitting and receiving device 2 includes a protrusion 24 and a supported portion 25. The protrusion 24 is a portion on the tip side in the axial direction of the ultrasonic wave transmitting and receiving device 2, and is provided to protrude from the elastic holding member 3 toward the tip side in the axial direction. The supported portion 25 is a portion on the base-end side in the axial direction of the ultrasonic wave transmitting and receiving device 2, and is housed in the elastic holding member 3. The supported portion 25 includes a support groove 26, which is a groove for engagement with the elastic holding member 3.

The elastic holding member 3 is a plastic elastic member elastically supporting the ultrasonic wave transmitting and receiving device 2, and is formed in a cylindrical shape to allow the protrusion 24 of the ultrasonic wave transmitting and receiving device 2 to protrude, while housing the supported portion 25. In the present embodiment, the elastic holding member 3 has a substantially cylindrical shape having a columnar outer peripheral surface 30. The elastic holding member 3 is formed of a plastic elastic material having insulating and elastic properties. The plastic elastic material is may be made of a viscoelastic material or an elastomer.

Hereinafter, the configuration of the elastic holding member 3 is described in detail with reference to FIGS. 1 to 4. In the present embodiment, the elastic holding member 3 includes a support cylindrical portion 31, a support bottom portion 32, and a leading projection 33. The elastic holding member 3 is seamlessly and integrally formed of silicone rubber or the like.

The support cylindrical portion 31 is formed in a cylindrical shape having an opening on the tip side in the axial direction, to house the supported portion 25 while being in contact with the transmitting-and-receiving-device side surface 21. Specifically, the support cylindrical portion 31 is provided to protrude from the support bottom portion 32 toward the tip side in the axial direction. An inner wall surface of the support cylindrical portion 31 is provided with a support protrusion 34 protruding therefrom. The support protrusion 34 is formed to be engaged with the support groove 26 provided in the supported portion 25 of the ultrasonic wave transmitting and receiving device 2.

The support bottom portion 32 substantially has a ring shape provided with a penetration portion 35, which is a through hole penetrating, in the axial direction, a thick plate-shaped portion having a prescribed thickness in the axial direction. The penetration portion 35 is formed to have an internal diameter smaller than the internal diameter of the support cylindrical portion 31. That is, the support bottom portion 32 is provided to protrude inward in a radial direction at a base-end portion in the axial direction of the support cylindrical portion 31, and thus to be in contact with the transmitting-and-receiving-device bottom 23. The support bottom portion 32 is formed as a thick portion having a thickness in the radial direction larger than the thicknesses of the support cylindrical portion 31 and the leading projection 33.

The leading projection 33 is provided to protrude from the bottom of the support bottom portion 32 toward the base-end side in the axial direction. In the present embodiment, two leading projections 33 are symmetrically provided across the central axis line CL from each other.

Figure 4:
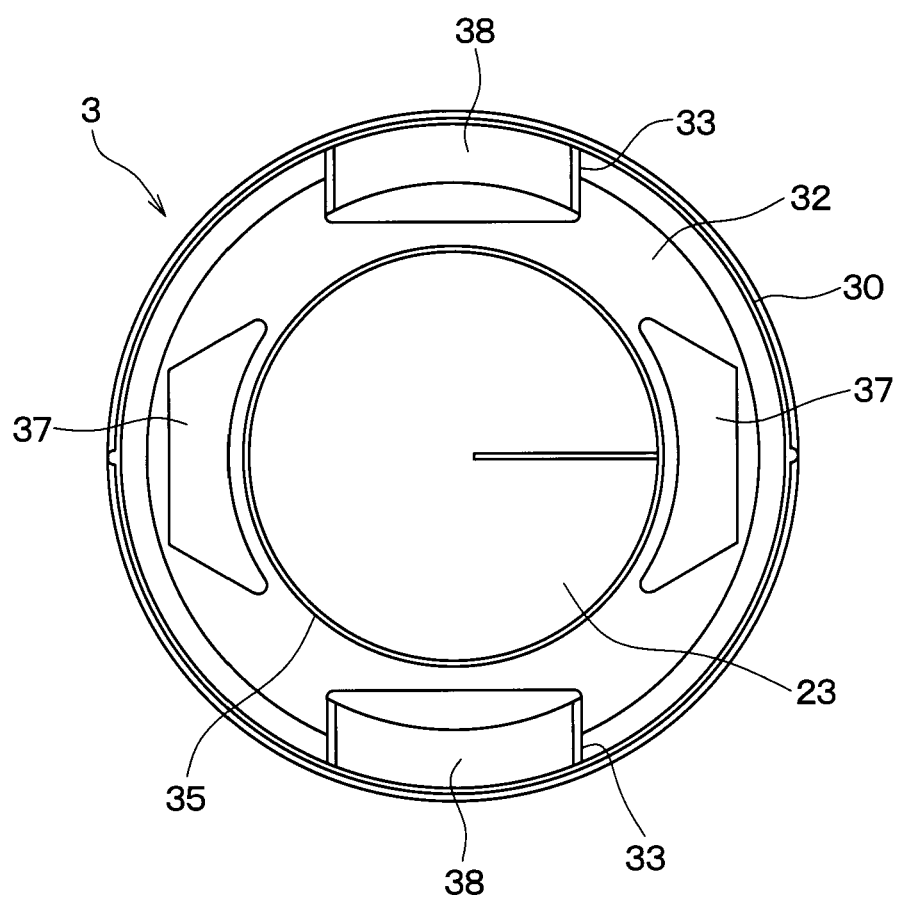
FIG. 4 is a bottom view of the ultrasonic wave transmitting and receiving device and the elastic holding member illustrated in FIG. 2.

Supposing that there is a virtual plane perpendicular to the central axis line CL, the leading projection 33 is, as illustrated in FIG. 4, i.e., in the view from the bottom, formed in a tongue shape having a width direction substantially parallel with a tangent direction of a circle, which is a line of intersection between the outer peripheral surface 30 and the virtual plane. Specifically, the leading projection 33 has a width-wise dimension that is less than or equal to half the external diameter of the support bottom portion 32. Further, the leading projection 33 is formed to have a thickness in the radial direction smaller than the thickness in the radial direction of the support bottom portion 32.

The outer peripheral surface 30 of the elastic holding member 3 is provided with an engagement recess 36. The engagement recess 36 is provided nearer the base-end side in the axial direction than to the support cylindrical portion 31. Further, the engagement recess 36 is provided to be recessed inward in the radial direction. The radial direction is a direction radially extending from the central axis line CL.

Specifically, the engagement recess 36 is a groove portion provided to extend in a peripheral direction, and is provided in the support bottom portion 32. The peripheral direction is a direction surrounding the central axis line CL. That is, the peripheral direction is the circumferential direction of a virtual circle on the virtual plane, with the virtual circle having, as its center, an intersection of the virtual plane and the central axis line CL. In the present embodiment, two engagement recesses 36 are symmetrically provided across the central axis line CL from each other.

Figure 3:
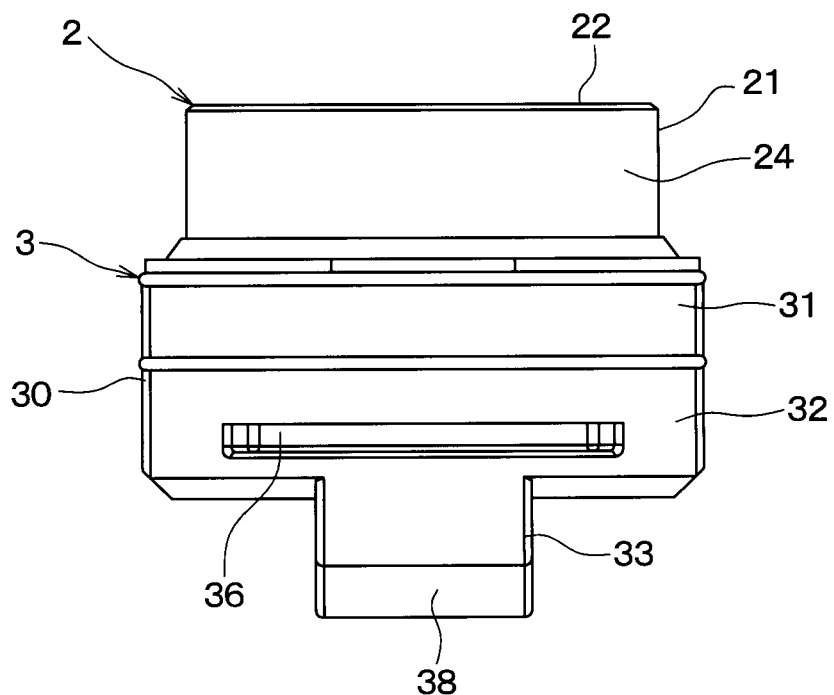
FIG. 3 is a front view of the ultrasonic wave transmitting and receiving device and the elastic holding member illustrated in FIG. 2.

As illustrated in FIG. 3, the engagement recess 36 is provided at a position corresponding to the leading projection 33 with respect to the peripheral direction. In other words, the engagement recess 36 is provided at a position, which is a base-end portion in the axial direction of the support bottom portion 32 and which is adjacent to the leading projection 33 in the axial direction. Thus, the leading projection 33 is formed to increase the opening width along the axial direction of the engagement recess 36 when elastically distorted, bending toward the central axis line CL.

The elastic holding member 3 further includes an auxiliary recess 37 and a tapered surface 38 as components for inducing or promoting the elastic deformation of making the leading projection 33 bend toward the central axis line CL.

The auxiliary recess 37 is a recess provided at the bottom of the support bottom portion 32, and is formed to have an opening on the base-end side in the axial direction. In the present embodiment, two auxiliary recesses 37 are symmetrically provided across the central axis line CL from each other. Specifically, the leading projections 33 and the auxiliary recesses 37 are alternately disposed in the peripheral direction.

In the present embodiment, the auxiliary recess 37 is formed in a substantially trapezoidal shape in the view from the bottom. The auxiliary recess 37 is provided between the outer peripheral surface 30 of the elastic holding member 3 and an inner peripheral surface of the penetration portion 35. That is, the two auxiliary recesses 37 are formed as isolated spaces communicating with neither of a space outside the outer peripheral surface 30 nor a space inside the penetration portion 35, in the radial direction.

The tapered surface 38 is provided continuously from the outer peripheral surface 30 of the elastic holding member 3 at a terminal portion in the axial direction of the leading projection 33. That is, the tapered surface 38 is formed as an outward-directed oblique surface provided at a projecting end, i.e., a distal end of the leading projection 33 projecting from the support bottom portion 32.

Referring again to FIG. 1, the elastic covering member 4 is configured to closely cover the protrusion 24 of the ultrasonic wave transmitting and receiving device 2. In the present embodiment, the elastic covering member 4 includes a cylindrical portion 41 and a flange portion 42. The elastic covering member 4 is seamlessly and integrally formed of a plastic elastic material, such as silicone rubber, having insulating and elastic properties.

The cylindrical portion 41 is a cylinder-shaped portion provided along the central axis line CL and includes a cylinder inner surface as an inner peripheral surface. This inner peripheral surface is formed to be in close contact with a portion corresponding to the protrusion 24 of the transmitting-and-receiving-device side surface 21. The cylindrical portion 41 becomes sandwiched between the transmitting-and-receiving-device side surface 21 and the attachment hole B3 when the protrusion 24 of the ultrasonic wave transmitting and receiving device 2 is inserted into the attachment hole B3 to mount the ultrasonic sensor 1 on the bumper B. The cylindrical portion 41 is formed such that a tip surface in the axial direction of the cylindrical portion 41 is substantially level with the bumper outer face B1 of when the ultrasonic sensor 1 is mounted on the bumper B.

The flange portion 42 is formed in a ring shape protruding outward in the radial direction from a base-end portion in the axial direction of the cylindrical portion 41. The flange portion 42 becomes in contact with a tip in the axial direction of the support cylindrical portion 31 while the elastic covering member 4 is mounted on the ultrasonic wave transmitting and receiving device 2. The flange portion 42 becomes sandwiched between the sensor case 6 and the bumper inner face B2 when the ultrasonic sensor 1 is mounted on the bumper B.

The damper 5 is a disk-shaped member having an external diameter corresponding to the internal diameter of the penetration portion 35, and is fitted in the cylinder-shaped space inside the penetration portion 35. The damper 5 is formed of a foamed elastic body, such as foamed silicone, having insulating and elastic properties, to minimize vibration transmission from the ultrasonic wave transmitting and receiving device 2 to the sensor case 6.

The sensor case 6 constituting the housing of the ultrasonic sensor 1 is integrally formed of hard plastic such as polypropylene. The sensor case 6 is configured to house and hold the elastic holding member 3. That is, the sensor case 6 elastically supports the ultrasonic wave transmitting and receiving device 2 via the elastic holding member 3.

Figure 5:
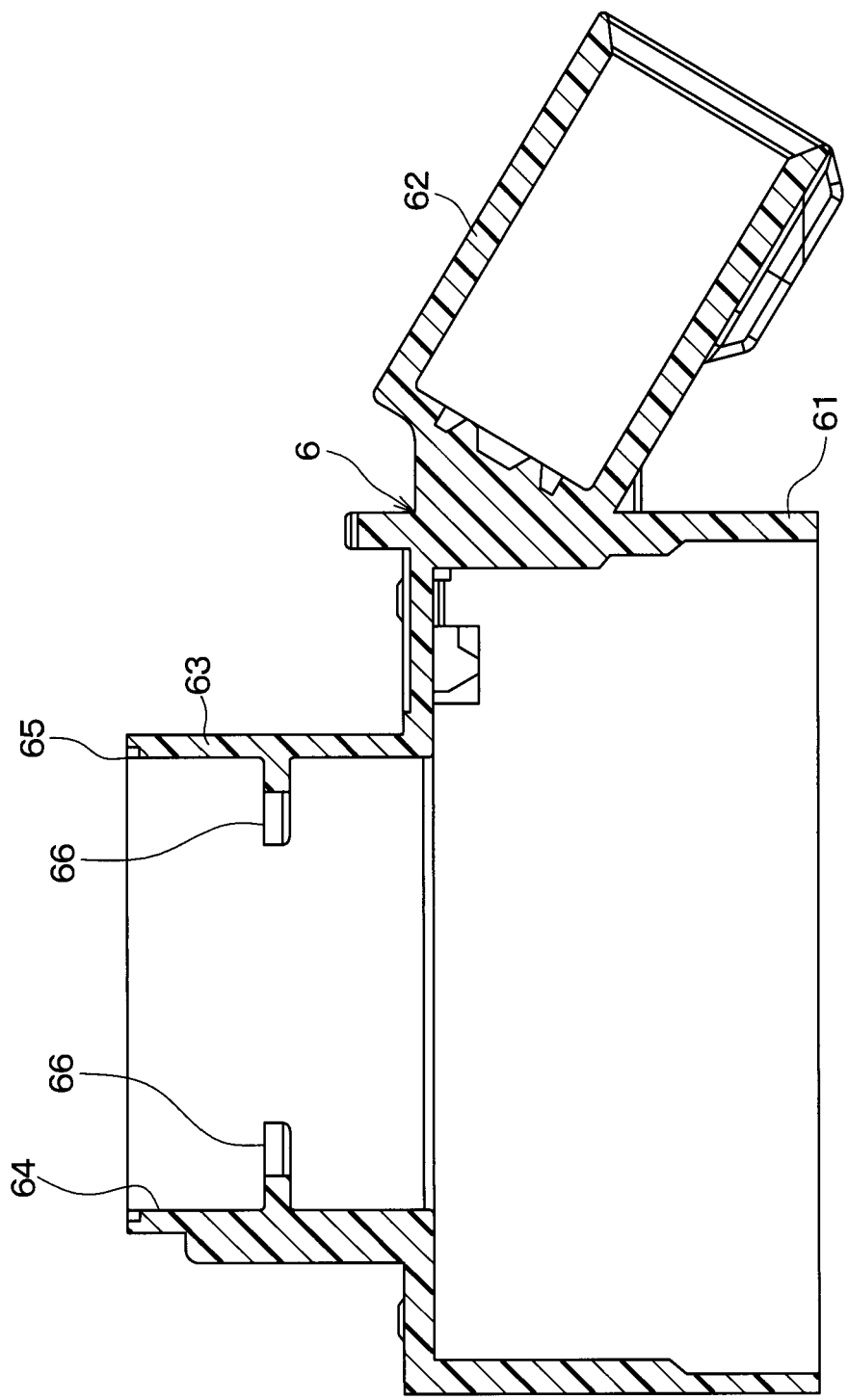
FIG. 5 is a sectional side view of a sensor case illustrated in FIG. 1.

In the present embodiment, the sensor case 6 includes a case main portion 61, a connector 62, and a case cylindrical portion 63. Hereinafter, the configuration of the sensor case 6 is described in detail with reference to FIGS. 1 and 5.

The case main portion 61 is a box-shaped portion formed in a substantially rectangular parallelepiped shape, and is formed in a bottomed cylindrical shape having an opening on the base-end side in the axial direction. The case main portion 61 has a circuit board, a wiring portion, and the like housed therein. The circuit board, the wiring portion, and the like are not shown in the drawings. The connector 62 is provided to extend outward from a side wall of the case main portion 61 for electrical connection of the ultrasonic sensor 1 to another device such as an electronic control unit.

The case cylindrical portion 63 is provided to protrude from the case main portion 61 toward the tip side in the axial direction. The case cylindrical portion 63 is formed in a cylindrical shape having an inner peripheral surface 64 in close contact with the outer peripheral surface 30 of the elastic holding member 3. That is, the internal diameter of the case cylindrical portion 63 is set to correspond to the external diameter of the outer peripheral surface 30 of the elastic holding member 3. The case cylindrical portion 63 includes, at a tip in the axial direction of the case cylindrical portion 63, a tip aperture 65 having an opening on the tip side in the axial direction.

A cylinder-shaped space inside the case cylindrical portion 63 is provided which communicates with a space inside the case main portion 61. Hereinafter, the space inside the case cylindrical portion 63 and the space inside the case main portion 61 are collectively referred to as a space inside the sensor case 6. The space inside the sensor case 6 is filled with the filler 7, such as silicone rubber, having insulating and elastic properties. In the present embodiment, the auxiliary recess 37 is also filled with the filler 7.

The case cylindrical portion 63 includes an engagement protrusion 66. The engagement protrusion 66 is provided nearer the base-end side in the axial direction than to the tip aperture 65, and provided to protrude inward in the radial direction. The engagement protrusion 66 is formed to be housed in the engagement recess 36 of the elastic holding member 3 and thus fitted in the engagement recess 36.

That is, the elastic holding member 3 is configured to allow contact of the leading projection 33 with the engagement protrusion 66 during the insertion of the elastic holding member 3 from the elastic holding member's leading-projection-33 side into the case cylindrical portion 63 to elastically distort the leading projection 33 while making the leading projection 33 bend toward the central axis line CL. Further, the tapered surface 38 at the terminal portion in the axial direction of the leading projection 33 is brought into contact with the engagement protrusion 66 during the insertion of the elastic holding member 3 into the case cylindrical portion 63, to induce the above-described elastic deformation of the leading projection 33. Further, the auxiliary recess 37 is provided by removal of a wall portion of the support bottom portion 32 provided to extend along the elastic deformation direction of the leading projection 33, to decrease the rigidity of the wall portion.

(Effects)

Hereinafter, the effects exhibited by the configurations of the present embodiment are described with reference to the drawings.

In a step of producing the ultrasonic sensor 1 having the configurations of the present embodiment, the supported portion 25 on the base-end side in the axial direction of the ultrasonic wave transmitting and receiving device 2 is inserted into the support cylindrical portion 31 of the elastic holding member 3. The insertion brings the transmitting-and-receiving-device bottom 23, which is the end surface on the base-end side in the axial direction of the ultrasonic wave transmitting and receiving device 2, into contact with the support bottom portion 32 provided to protrude inward in the radial direction at the base-end portion of the support cylindrical portion 31. In the insertion, the support protrusion 34 of the elastic holding member 3 is engaged with the support groove 26 in the supported portion 25 of the ultrasonic wave transmitting and receiving device 2. Thus, the ultrasonic wave transmitting and receiving device 2 is elastically supported by the elastic holding member 3.

Subsequently, the elastic holding member 3 elastically supporting the ultrasonic wave transmitting and receiving device 2 is inserted from the elastic holding member's leading-projection-33 side on the base-end side in the axial direction into the case cylindrical portion 63 of the sensor case 6 along the central axis line CL. The insertion allows the engagement protrusion 66 to be housed in the engagement recess 36, with the engagement protrusion 66, in the case cylindrical portion 63, protruding inward in the radial direction, and the engagement recess 36 in the elastic holding member 3, protruding inward in the radial direction. That is, the engagement protrusion 66 is engaged with the engagement recess 36. Thus, the sensor case 6 houses and holds the elastic holding member 3.

In the insertion of the elastic holding member 3 into the case cylindrical portion 63, the leading projection 33 is brought into contact with the engagement protrusion 66 before the engagement of the engagement protrusion 66 with the engagement recess 36. The contact of the leading projection 33 with the engagement protrusion 66 elastically distorts the leading projection 33 while making the leading projection bend toward the central axis line CL.

The leading projection 33 is provided at a position corresponding to the engagement recess 36 with respect to the peripheral direction surrounding the central axis line CL. Therefore, the elastic deformation of the leading projection 33 in the aspect described above increases the opening width along the axial direction of the aperture on the outer periphery in the radial direction of the engagement recess 36. Thus, the engagement of the engagement protrusion 66 with the engagement recess 36 can be beneficially promoted.

The engagement of the engagement protrusion 66 with the engagement recess 36 sets the elastic holding member 3 elastically supporting the ultrasonic wave transmitting and receiving device 2, and the case cylindrical portion 63 of the sensor case 6 at the prescribed positional relationship in the axial direction. The engagement of the engagement protrusion 66 with the engagement recess 36 during the insertion of the elastic holding member 3 into the case cylindrical portion 63 restores the elastic deformation of the leading projection 33. The impact during this restoration generates notch sensation. Therefore, a worker performing the step of producing the ultrasonic sensor 1 is capable of accurately determining that the elastic holding member 3 and the case cylindrical portion 63 are set at the prescribed positional relationship in the axial direction.

In the present embodiment, the support bottom portion 32 including the engagement recess 36 is formed as a thick portion. That is, the support bottom portion 32 is formed to have a thickness in the radial direction larger than the thicknesses of the support cylindrical portion 31 and the leading projection 33. The support bottom portion 32 is provided as a thick plate-shaped portion having a prescribed thickness in the axial direction, specifically a thickness larger than the thicknesses in the radial direction of the support cylindrical portion 31 and the leading projection 33. This configuration can excellently maintain the engagement state of the elastic holding member 3 with the sensor case 6 after the completion of the attachment of the elastic holding member 3 to the sensor case 6. That is, the elastic holding member 3 can be excellently prevented from detaching from the sensor case 6 after the completion of the attachment of the elastic holding member 3 to the sensor case 6.

In the present embodiment, the engagement recess 36 is provided at a position, which is the base-end portion in the axial direction of the support bottom portion 32 and which is adjacent to the leading projection 33 in the axial direction. In this configuration, the contact of the leading projection 33 with the engagement protrusion 66 elastically distorts the leading projection 33 while making the leading projection 33 bend toward the central axis line CL, and thus beneficially increases the opening width of the engagement recess 36. Accordingly, this configuration can beneficially promote the engagement of the engagement protrusion 66 with the engagement recess 36.

In the present embodiment, the elastic holding member 3 includes the tapered surface 38 provided to be continuous from the outer peripheral surface 30 at the terminal portion in the axial direction of the leading projection 33. The tapered surface 38 is brought into contact with the engagement protrusion 66 during the insertion of the elastic holding member 3 into the case cylindrical portion 63, to elastically distort the leading projection 33 while making the leading projection 33 bend toward the central axis line CL. Accordingly, this configuration can beneficially induce the elastic deformation of the leading projection 33.

In the present embodiment, the support bottom portion 32 includes the auxiliary recess 37 having an opening on the base-end side in the axial direction. The auxiliary recess 37 is formed by removal of a wall portion of the support bottom portion 32 provided to extend along the elastic deformation direction of the leading projection 33, to decrease the rigidity of the wall portion. Therefore, the auxiliary recess 37 promotes the elastic deformation of the leading projection 33 by the contact with the engagement protrusion 66 during the insertion of the elastic holding member 3 into the case cylindrical portion 63. Accordingly, this configuration can excellently attain the attachment of the elastic holding member 3 to the sensor case 6.

After the completion of the attachment of the elastic holding member 3 to the sensor case 6, the space inside the sensor case 6 is filled with the filler 7. In the filling, the auxiliary recess 37 is also filled with the filler 7. This configuration can excellently prevent the elastic holding member 3 from detaching from the sensor case 6 after the attachment of the elastic holding member 3 to the sensor case 6. That is, this configuration excellently attains both the workability of attachment work of the elastic holding member 3 to the sensor case 6, and the secure fixation of the elastic holding member 3 to the sensor case 6 after the filling with the filler 7.

As described above, the configurations of the present embodiment can improve workability during the production of the ultrasonic sensor 1 than to during the production of a conventional ultrasonic sensor.

Modified Examples

The present disclosure is not limited to the above-described embodiment. Therefore, appropriate modifications are applicable to the embodiment. Hereinafter, typical modified examples are described. In the following description about the modified examples, different points from the embodiment are mainly described. Identical reference signs are assigned to mutually identical or equal portions in the embodiment and the modified examples. Accordingly, in the following description about the modified examples, the description in the embodiment can be, without any technically inconsistent or special additional description, appropriately applied to the constituent element having an identical reference sign with the reference sign of a constituent element in the embodiment.

The present disclosure is not limited to the aspect of mounting the ultrasonic sensor 1 on the bumper B. That is, the ultrasonic sensor 1 can be, in in-vehicle use, mounted on a front grille or a vehicle-body panel. Further, the ultrasonic sensor 1 is not limited to in-vehicle use. That is, the ultrasonic sensor 1 can also be mounted on, for example, a conveyor provided in a factory or the like, agricultural equipment (e.g., a cultivator), or a small airplane.

The ultrasonic sensor 1 is not limited to the configuration capable of transmitting and receiving an ultrasonic wave. That is, the ultrasonic sensor 1 may have, for example, a configuration capable of only transmitting an ultrasonic wave. Alternatively, the ultrasonic sensor 1 may have only a function of receiving a reflected wave obtained by reflection of an ultrasonic wave transmitted as a probe wave from another ultrasonic transmitter on a nearby object.

The shapes of the portions are not limited to the above-described specific examples. For example, the leading projection 33, the engagement recess 36, the auxiliary recess 37, and the engagement protrusion 66 are not particularly limited in terms of the number of pieces to be provided. Accordingly, for example, one each of the leading projection 33, the engagement recess 36, and the engagement protrusion 66 may be provided. Alternatively, for example, three each of the leading projection 33, the engagement recess 36, and the engagement protrusion 66 may be provided.

The shape of the auxiliary recess 37 is not limited to the above-described specific example. That is, for example, a plurality of round, oval, or rectangular holes aligned in the radial direction may constitute a plurality of auxiliary recesses 37.

Figure 6:
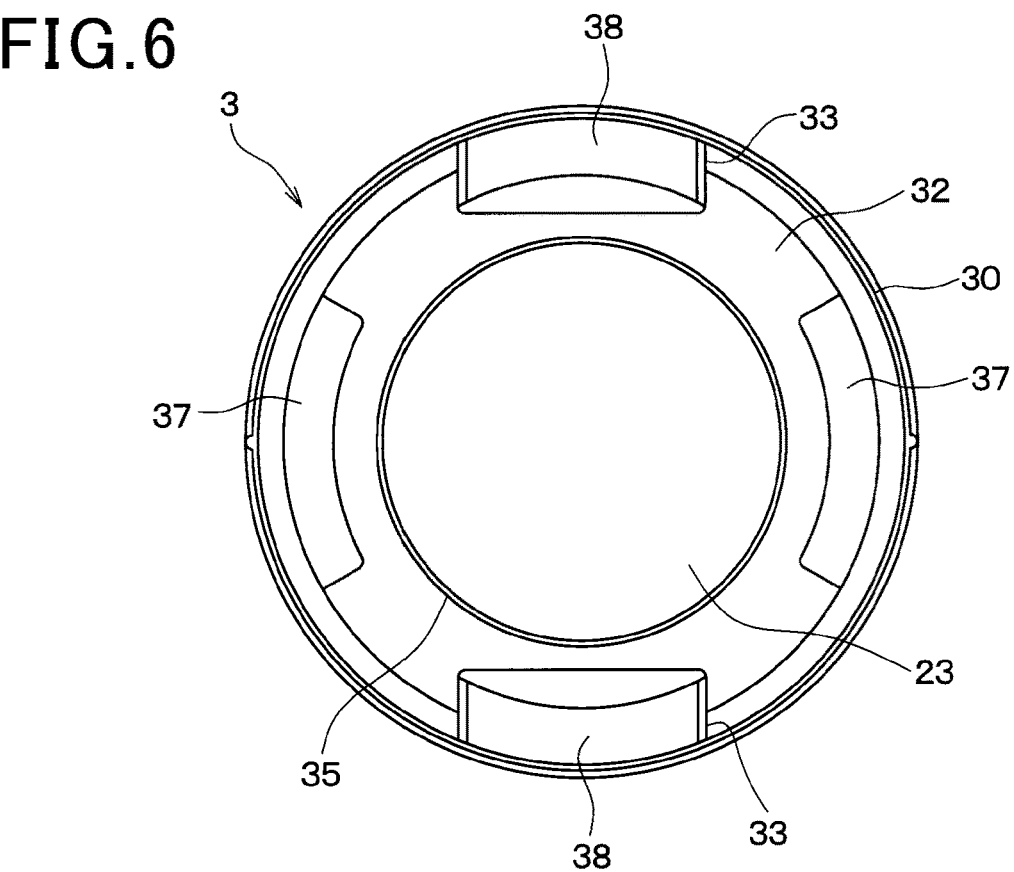
FIG. 6 is a bottom view illustrating one modified example of the elastic holding member illustrated in FIG. 4.

As illustrated in FIG. 6, the auxiliary recess 37 may be provided to have an opening outward in the radial direction. That is, the auxiliary recess 37 may be formed which communicates with the space outside the outer peripheral surface 30.

Figure 7:
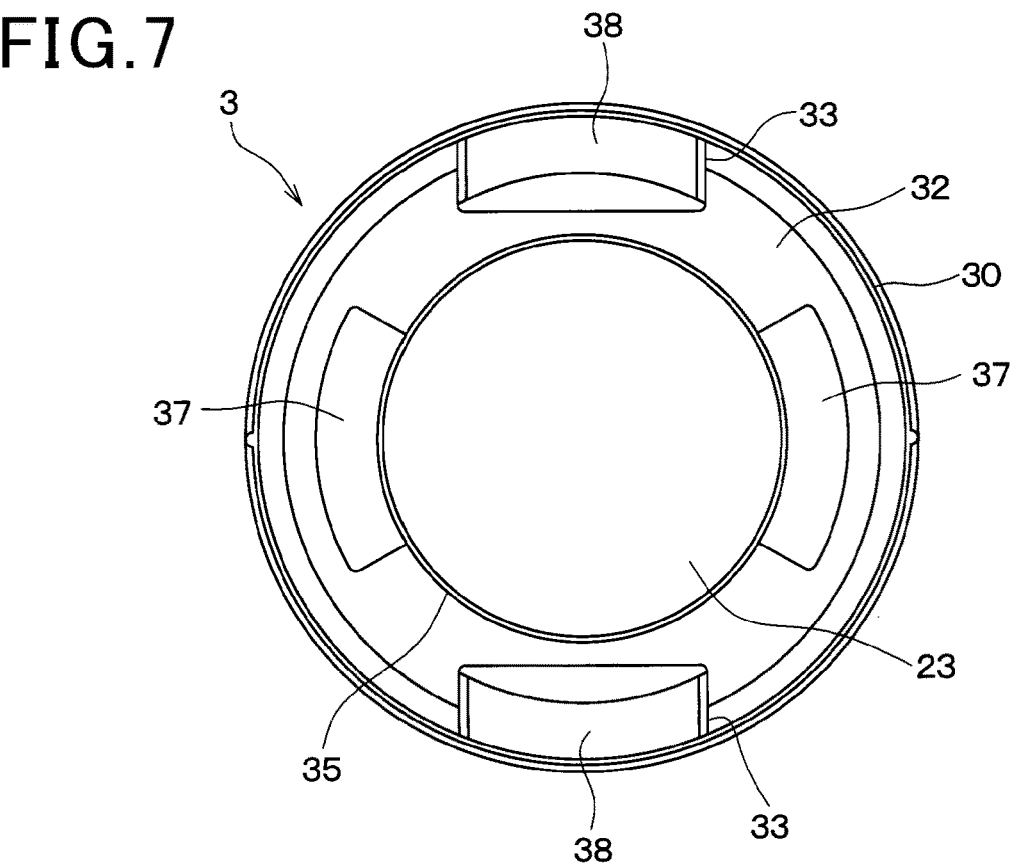
FIG. 7 is a bottom view illustrating another modified example of the elastic holding member illustrated in FIG. 4.

Alternatively, the auxiliary recess 37 may, as illustrated in FIG. 7, be provided to have an opening inward in the radial direction. That is, the auxiliary recess 37 may be provided which communicates with the space inside the penetration portion 35.

Figure 8:
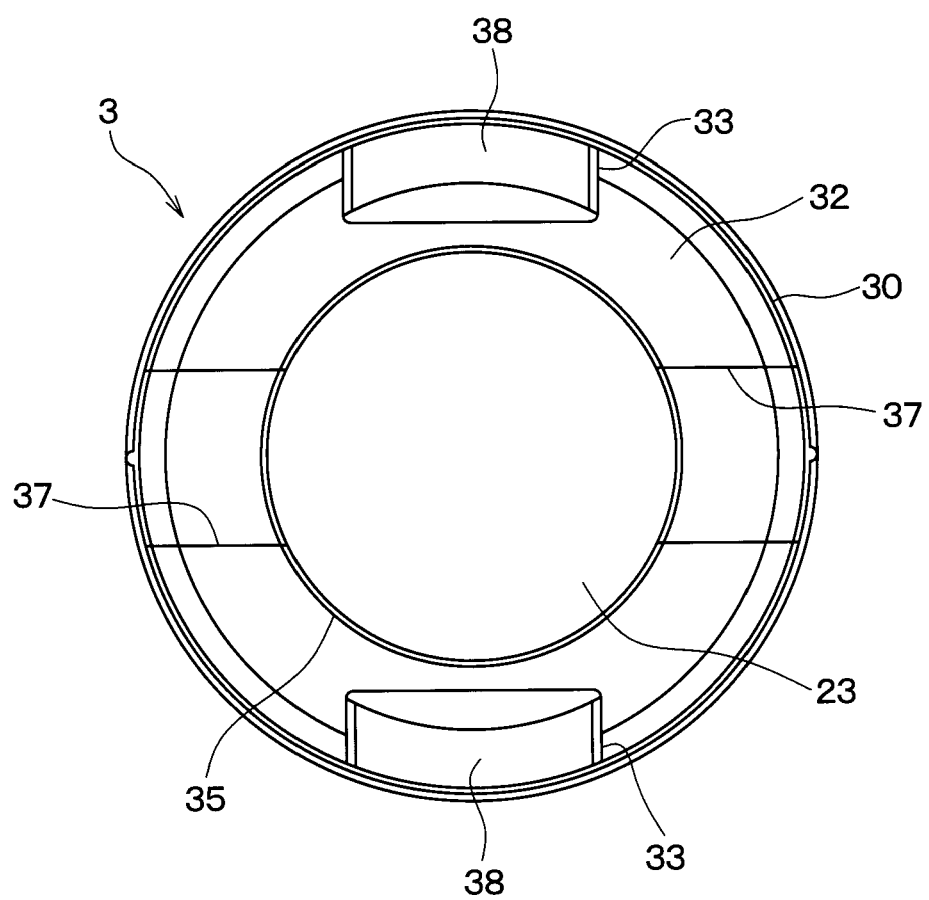
FIG. 8 is a bottom view illustrating another modified example of the elastic holding member illustrated in FIG. 4.

Alternatively, the auxiliary recess 37 may, as illustrated in FIG. 8, be provided to have the space inside the penetration portion 35 communicate with the space outside the outer peripheral surface 30. That is the auxiliary recess 37 may be formed in a slit shape provided along the diameter of the support bottom portion 32 in the view from the bottom.

In the present embodiment, the elastic covering member 4 is configured separately from the elastic holding member 3. The present disclosure, however, is not limited to this aspect. That is, the elastic covering member 4 may be formed seamlessly and integrally with the elastic holding member 3.

The above-described plurality of constituent elements formed seamlessly and integrally may be formed by putting separate members together. Similarly, the plurality of constituent elements formed by putting separate members together may be formed seamlessly and integrally.

The above-described plurality of constituent elements formed of an identical material may be formed of different materials. Similarly, the plurality of constituent elements formed of different materials may be formed of an identical material.

Needless to say, the elements constituting the embodiment are not necessarily required, for example, unless particularly mentioned as necessary or clearly necessary in principle. Further, when numerical values are referred to as the number of the constituent elements, numerical values, amounts, ranges, and the like, the present disclosure is never limited to the specific numbers, for example, unless the specific numbers are particularly mentioned as necessary, or the numerical values are clearly limited in principle to the specific numbers. Similarly, when the shapes, the directions, the positional relationships, and the like of the constituent elements, etc. are referred to, the present disclosure is not limited to those specified, for example, unless the shapes, the directions, the positional relationships, and the like that are specified are particularly mentioned as necessary, or the shapes, the directions, the positional relationships, and the like are limited in principle to those specified.

The modified example is not also limited to the modified examples described above. Further, a plurality of modified examples can be combined with each other. Further, the whole or a part of the embodiment can be combined with the whole or a part of a modified example.

What is claimed is:

1. An ultrasonic sensor comprising:
   an ultrasonic wave transmitting and receiving device formed in a columnar shape having an axial direction parallel with a central axis line;
   an elastic holding member that is a plastic elastic member elastically supporting the ultrasonic wave transmitting and receiving device, and that is formed in a cylindrical shape to allow housing a supported portion on a base-end side in the axial direction of the ultrasonic wave transmitting and receiving device; and
   a sensor case configured to include a case cylindrical portion formed in a cylindrical shape having an inner peripheral surface in contact with an outer peripheral surface along the axial direction of the elastic holding member, and to house and hold the elastic holding member,
   the case cylindrical portion including an engagement protrusion provided nearer the base-end side in the axial direction than to a tip aperture having an opening on a tip side in the axial direction, and provided to protrude inward in a radial direction perpendicular to the axial direction,
   the elastic holding member including:
   a support cylindrical portion formed in a cylindrical shape having an opening on the tip side in the axial direction, to be in contact with a transmitting-and-receiving-device side surface that is an outer peripheral surface along the axial direction of the ultrasonic wave transmitting and receiving device;
   a support bottom portion provided to protrude inward in the radial direction at a base-end portion in the axial direction of the support cylindrical portion and thus to be in contact with a transmitting-and-receiving-device bottom that is an end surface on the base-end side in the axial direction of the ultrasonic wave transmitting and receiving device;
   an engagement recess provided nearer the base-end side in the axial direction than to the support cylindrical portion, and provided to be recessed inward in the radial direction and thus house the engagement protrusion; and
   a leading projection provided at a position corresponding to the engagement recess with respect to a peripheral direction surrounding the central axis line, and provided to project from the support bottom portion toward the base-end side in the axial direction,
   the support bottom portion being formed as a thick portion having a thickness in the radial direction larger than thicknesses of the support cylindrical portion and the leading projection, and
   the engagement recess being provided in the support bottom portion.

2. The ultrasonic sensor according to claim 1,
   wherein the leading projection is formed in a tongue shape having a width direction substantially parallel with a tangent direction of a circle, which is a line of intersection between the outer peripheral surface along the axial direction of the elastic holding member and a virtual plane perpendicular to the central axis line.

3. The ultrasonic sensor according to claim 1,
   wherein the elastic holding member further includes a tapered surface provided continuously from the outer peripheral surface of the elastic holding member at a terminal portion in the axial direction of the leading projection, to allow a contact of the leading projection with the engagement protrusion during the insertion of the elastic holding member into the case cylindrical portion to elastically distort the leading projection while making the leading projection bend toward the central axis line.

4. The ultrasonic sensor according to claim 3,
   wherein the tapered surface is brought into contact with the engagement protrusion during the insertion of the elastic holding member into the case cylindrical portion, to induce the elastic deformation of the leading projection.

5. The ultrasonic sensor according to claim 1,
   wherein the support bottom portion includes, as an auxiliary recess, an opening on the base-end side in the axial direction to promote an elastic deformation of the leading projection by the contact of the leading projection with the engagement protrusion during the insertion of the elastic holding member into the case cylindrical portion.

6. The ultrasonic sensor according to claim 5,
   wherein the auxiliary recess is filled with a filler.

* * * * *